(12) United States Patent
Burge

(10) Patent No.: US 6,709,047 B2
(45) Date of Patent: Mar. 23, 2004

(54) BULKHEAD LOCKING CONSTRUCTION

(75) Inventor: David Burge, Marysville, OH (US)

(73) Assignee: Honda Giken Kogyo Kabushiki Kaihsa, Tokyo (JP)

( * ) Notice: Subject to any disclaimer, the term of this patent is extended or adjusted under 35 U.S.C. 154(b) by 0 days.

(21) Appl. No.: 10/199,685

(22) Filed: Jul. 19, 2002

(65) Prior Publication Data

US 2004/0012230 A1 Jan. 22, 2004

(51) Int. Cl.⁷ .................................................. B60J 7/00
(52) U.S. Cl. ................... 296/209; 296/204; 296/203.03
(58) Field of Search ........................... 296/209, 187.09, 296/203.01, 204; 410/52; 105/404, 353, 411, 416, 418, 406.01; 49/504, 470, 501; 52/211, 209

(56) References Cited

U.S. PATENT DOCUMENTS

| | | | |
|---|---|---|---|
| 3,132,891 A | | 5/1964 | Pyuro et al. |
| 3,724,153 A | | 4/1973 | Wessells, III et al. |
| 4,440,434 A | * | 4/1984 | Celli ........................... 296/209 |
| 4,582,357 A | * | 4/1986 | Nakamura et al. ........... 296/209 |
| 4,950,031 A | * | 8/1990 | Mizunaga et al. .......... 296/204 |
| 5,042,872 A | * | 8/1991 | Yoshii ......................... 296/209 |
| 5,207,475 A | | 5/1993 | Hellström |
| 5,246,264 A | * | 9/1993 | Yoshii ......................... 296/209 |
| 5,501,289 A | * | 3/1996 | Nishikawa et al. ........ 296/37.14 |
| 5,586,799 A | * | 12/1996 | Kanemitsu et al. .... 296/203.02 |
| 5,653,495 A | * | 8/1997 | Bovellan et al. ............. 296/209 |
| 5,700,049 A | * | 12/1997 | Shibata ....................... 296/209 |
| 5,782,525 A | | 7/1998 | Honma et al. |
| 5,810,428 A | * | 9/1998 | Maki ...................... 296/203.02 |
| 5,921,618 A | * | 7/1999 | Mori et al. .................. 296/209 |
| 6,053,564 A | * | 4/2000 | Kamata et al. .............. 296/209 |
| 6,068,330 A | | 5/2000 | Kasuga et al. |
| 6,099,194 A | * | 8/2000 | Durand ........................ 296/204 |
| 6,193,306 B1 | | 2/2001 | Lee |
| 6,217,109 B1 | * | 4/2001 | Okana et al. .......... 296/203.03 |
| 6,247,287 B1 | * | 6/2001 | Takabatake .................. 296/188 |
| 6,270,600 B1 | * | 8/2001 | Wycech ........................ 156/79 |
| 6,293,306 B1 | * | 9/2001 | Brenes .................. 137/601.09 |
| 6,354,656 B1 | * | 3/2002 | Hwang ........................ 296/209 |
| 6,378,933 B1 | * | 4/2002 | Schoen et al. .............. 296/209 |
| 6,409,257 B1 | * | 6/2002 | Takashina et al. .......... 296/209 |
| 6,428,085 B1 | * | 8/2002 | Miyasaka et al. ........... 296/209 |
| 6,474,723 B2 | * | 11/2002 | Czaplicki et al. ...... 296/203.03 |
| 6,550,847 B2 | * | 4/2003 | Honda et al. .......... 296/203.03 |
| 6,578,909 B1 | * | 6/2003 | Reed et al. ............ 296/203.01 |
| 2003/0093969 A1 | * | 5/2003 | Saldana ........................ 52/715 |

FOREIGN PATENT DOCUMENTS

| | | | |
|---|---|---|---|
| JP | 64 18794 | * | 1/1989 |
| JP | 5 85404 | * | 4/1993 |
| JP | 5 208688 | * | 8/1993 |
| JP | 5 229455 | * | 9/1993 |

* cited by examiner

*Primary Examiner*—Kiran Patel
(74) *Attorney, Agent, or Firm*—Fay, Sharpe, Fagan, Minnich & McKee, LLP

(57) ABSTRACT

A hollow sill beam assembly for use on a vehicle body construction is provided. The sill beam assembly includes a first elongated side sill member and a second elongated side sill member mated to the first side sill member. A hollow area is defined between the first and second elongated side sill members. A transverse slot is defined in the second side sill member. A reinforcing member is received in the slot and fixedly secured to the first side sill member.

9 Claims, 4 Drawing Sheets

BULKHEAD LOCKING CONSTRUCTION

BACKGROUND OF THE INVENTION

1. Field of the Invention

The present invention relates to a vehicle body construction. More particularly, the present invention relates to a reinforcing member or bulkhead for reinforcing a hollow structural member of a vehicle frame. The present invention finds particular application as an side sill beam assembly of a vehicle frame and will be described with particular reference thereto. It is to be appreciated, however, that the invention may relate to other similar environments and applications.

2. Description of the Prior Art

Prior art sill beam assemblies typically include an elongated hollow structural member made up of a side sill inner member, a side sill reinforcement or stiffener member and a side sill outer member and at least two bulkheads for reinforcing the hollow structural member. The inner and reinforcement members each include a plurality of walls defining a channel and, when the inner and reinforcement members are connected together, the channels define a hollow area of the structural member. The bulkheads are oriented in a generally transverse direction relative to the inner and reinforcement members. A first bulkhead is fixedly secured to the inner member and a second bulkhead is fixedly secured to the reinforcement member. The outer member connects to and generally nests around the reinforcement member forming a portion of the outer vehicle body, i.e., an outer vehicle body panel that a vehicle customer would see.

The use of two bulkheads satisfies two functions in the sill beam assembly. First, the bulkheads prevent the inner side sill member from opening during bending of the vehicle body as might occur during a side impact collision. More specifically, the first bulkhead that is fixedly secured to the inner member is welded in several places to the plurality of walls defining the channel of the inner side sill member thereby preventing the inner side sill member walls from opening, i.e., pulling apart from one another. If the inner side sill member is allowed to open, the vehicle body stiffness will be undesirably reduced. Thus, the first bulkhead keeps the side sill inner member from opening during a collision or normal operation of the vehicle.

Second, the bulkheads help prevent the side sill assembly and, more particularly, the side sill reinforcement member from collapsing during a side impact collision. More specifically, the second bulkhead that is fixedly secured to the reinforcement member is welded to one or more walls of the side sill reinforcement member such that, upon impact to the side sill reinforcement member, the second bulkhead will not fold over but, rather, provide impact resistance.

Obviously, it would be more cost and weight efficient if one bulkhead could be used to satisfy both of the aforementioned functions without unduly increasing manufacturing costs. However, heretofore, a single bulkhead was insufficient to accomplish the aforementioned functions desirable in a side sill beam assembly. More specifically, a single bulkhead was not capable of being attached or secured to both inner and reinforcement members of the side sill beam assembly. Initially, prior to assembly, the single bulkhead can be attached via welding to either the side sill inner member or the side sill reinforcement member. Before the single bulkhead could be attached to the other of the side sill inner and reinforcement members, the side sill members have to be secured to one another. Once the inner and reinforcement members are secured or connected together, the bulkhead cannot be accessed, thus, preventing the bulkhead from being attached to the other of the side sill inner and reinforcement members.

In prior art sill beam assemblies, use of a single bulkhead that is only attached to one of the inner and reinforcement members does not accomplish both the aforementioned desirable functions of side sill beam assemblies. For example, if the single bulkhead was welded only to the inner side sill member, it could not provide resistance to the outer side sill member against collapsing during a side impact collision. The single bulkhead would simply fold over during a side impact collision because it was not attached or secured to the reinforcement side sill member. If the single bulkhead was attached only to the side sill reinforcement member, it could not keep the inner side sill member from opening during bending of the vehicle body as might occur during a side impact collision. The single bulkhead would have no attachment to the inner side sill member and, therefore, could not prevent its sides from diverging from one another.

The present invention provides a new and improved sill beam assembly using a single bulkhead that overcomes the foregoing difficulties and others while providing the aforementioned advantageous features, including resisting opening of a side sill inner member and resisting collapse of the side sill reinforcement member during a side impact collision.

BRIEF SUMMARY OF THE INVENTION

In accordance with one aspect of the present invention, a hollow sill beam assembly for use on a vehicle body construction is provided. More particularly, in accordance with this aspect of the invention, the sill beam assembly includes a first elongated side sill member and a second elongated side sill member mated to the first side sill member. A hollow area is defined between the first and second elongated side sill members. A transverse slot is defined in the second side sill member. A reinforcing member is received in the slot and fixedly secured to the first side sill member.

According to another aspect of the present invention, a stiffening device is provided for reinforcing a hollow structural member of a vehicle frame having a longitudinal axis and an interior cavity. The hollow structural member is formed of an inner member and a reinforcement member that together define the interior cavity. More particularly, in accordance with this aspect of the invention, the stiffening device includes a generally planar body for reinforcing the structural member. The planar body is adapted to be received in the interior cavity at an angle approximately normal to the longitudinal axis of the structural member. At least one upstanding flange is disposed on at least one edge of the planar body for overlying a portion of the inner member to enable the structural member to be mounted to the inner member. At least another edge of the planar body is adapted to be received within a recess provided on the reinforcement member.

According to still another aspect of the present invention, a hollow side sill beam assembly located longitudinally along the exterior of a vehicle body is provided. More particularly, in accordance with this aspect of the invention, the side beam assembly includes a side sill inner panel and a side sill reinforcement panel connected to the side sill inner panel. A slot is defined in the side sill reinforcement panel.

A bulkhead extends between the side sill inner panel and the side sill reinforcement panel in a generally transverse direction relative to the longitudinal orientation of the sill beam assembly. The bulkhead is received in the slot to lock one edge of the bulkhead to a position on the side sill reinforcement panel. Another edge of the bulkhead is fixedly secured to the side sill inner panel.

According to another aspect of the present invention, a method of assembling a hollow structural member having a first half and a second half with a reinforcing member is provided. More particularly, in accordance with this aspect of the invention, the method includes the steps of providing a first half member defining a portion of a hollow area. A substantially planar reinforcing member having at least one upturned flange for attaching to the first half member is provided. The at least one upturned flange of the reinforcing member is attached to the first half member thereby connecting the reinforcing member to the first half member at an angle approximately normal to the first half member. A second half member defining another portion of the hollow area and having a transverse slot is provided. The first half member is mated to the second half member to fully define the hollow area. The reinforcing member is received in the slot of the second half member. The first half member is secured to the second half member.

BRIEF DESCRIPTION OF THE DRAWINGS

The invention may take physical form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
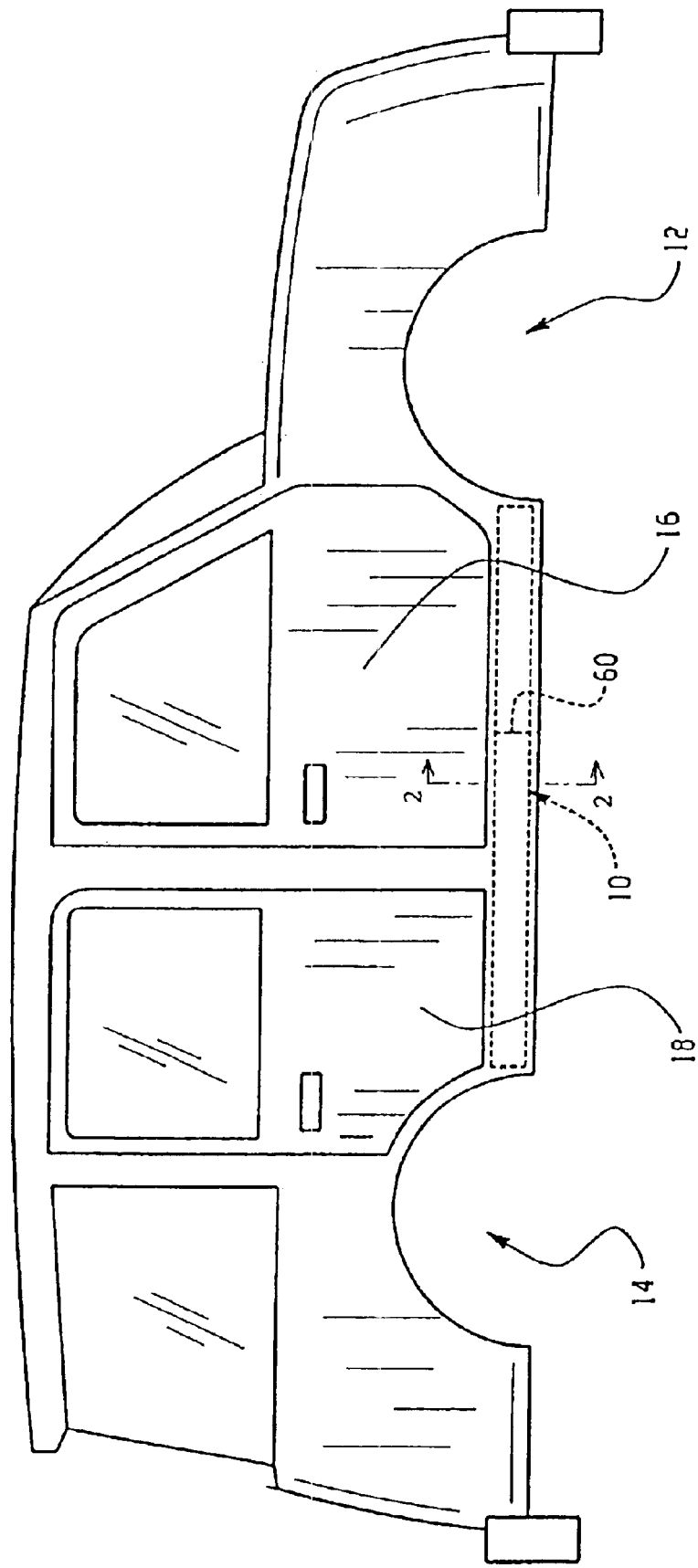
FIG. 1 is side elevational view of a vehicle body including an elongated hollow sill beam and a reinforcing member according to a first preferred embodiment of the present invention.

Referring now to the drawings wherein the showings are for purposes of illustrating the preferred embodiments of the invention only and not for purposes of limiting the same, FIG. 1 shows one side of a vehicle body according to a first preferred embodiment of the present invention including a side sill beam assembly 10 located between front and rear wheel wells 12,14. The side sill beam assembly 10 includes an elongated hollow structural member of the vehicle frame positioned below the vehicle right-side front and rear passenger doors 16,18. The side sill beam assembly 10 is defined along a longitudinal axis that is generally parallel to the longitudinal length of the vehicle body. The vehicle body includes a similar side sill beam assembly (not shown) positioned between the front and rear wheel wells 12,14 and below the vehicle left-side front and rear passenger doors (not shown).

Figure 2:
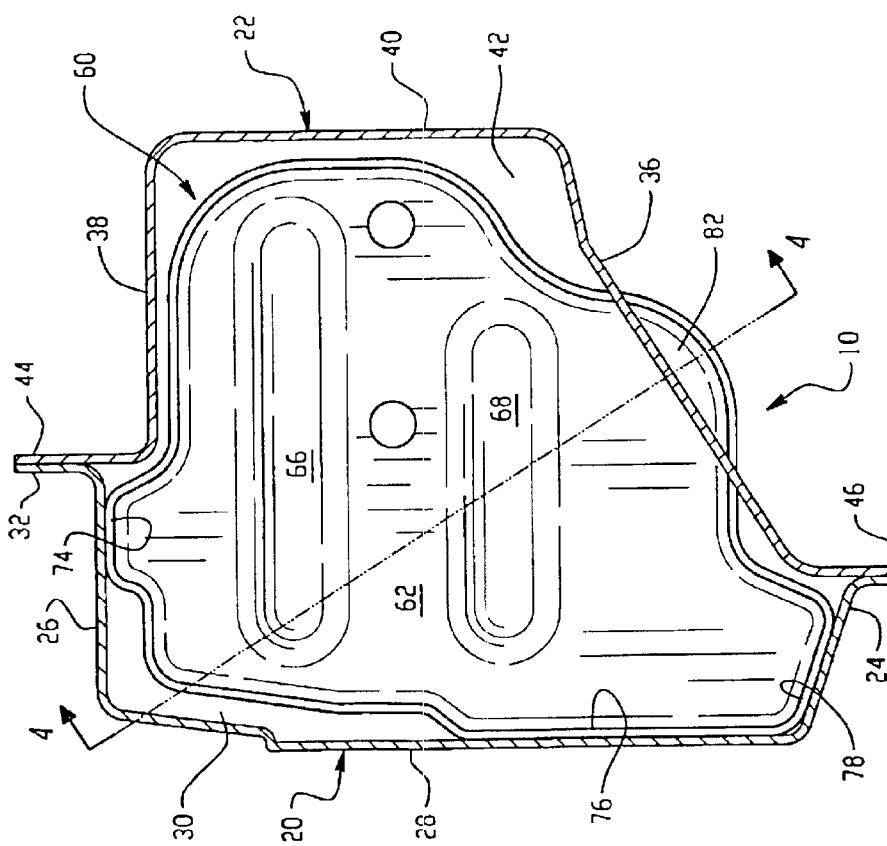
FIG. 2 is an enlarged cross-section view of the hollow sill beam and the reinforcing member taken along the line 2—2 of FIG. 1.

With additional reference to FIG. 2, the side sill beam assembly 10 includes a first or inner elongated side sill member 20 and a second or reinforcement elongated side sill member 22. The second side sill member 22 may also be referred to herein as a side sill reinforcement panel, an elongated side sill stiffener or a second half of the side sill beam assembly. The inner panel or member 20, also referred to herein as a first half of the side sill beam assembly, has an elongated channel-shaped configuration. The inner member 20 includes a lower side or wall 24, an upper side or wall 26, and a base side or wall 28. The lower and upper walls 24,26 extend outward from the base wall 28. Together the walls 24,26,28 define a generally U-shaped channel generally designated by reference numeral 30.

The inner member 20 further includes a pair of opposed, outer flanges including an upper flange 32 and a lower flange 34. The upper flange 32 extends from the upper wall 26 at an angle approximately normal to the upper wall 26 and approximately parallel to the base wall 28. Similarly, the lower flange 34 extends from the lower wall 24 in a direction opposite the extension of the upper flange 32 at an angle approximately normal to the lower wall 24 and approximately parallel to the base wall 28.

The reinforcement member 22, has an elongated channel-shaped configuration. The reinforcement member 22 includes an angled lower side or wall 36, an upper side or wall 38 and a base side or wall 40. The lower and upper walls 36,38 extend outward from the base wall 40. Together, the walls 36,38,40 define a channel generally designated by reference numeral 42.

The reinforcement member 22 further includes a pair of opposed, outer flanges including an upper flange 44 and a lower flange 46. The upper flange extends from the upper wall 38 at an angle approximately normal to the upper wall 38 and approximately parallel to the base wall 40. The lower flange 46 extends from the lower wall 36 in a direction opposite the extension of the upper flange 44 and approximately parallel to the base wall 40.

As shown in FIG. 2, the inner member 20 is mated to the reinforcement member 22 to form the hollow structural member as will be described in more detail below. The channel of the inner member 20 and the channel of the reinforcement member 22 together define a hollow area or interior cavity of the sill beam assembly 10 that has a generally uniform cross-section along a length of the sill beam assembly 10.

Figure 3:
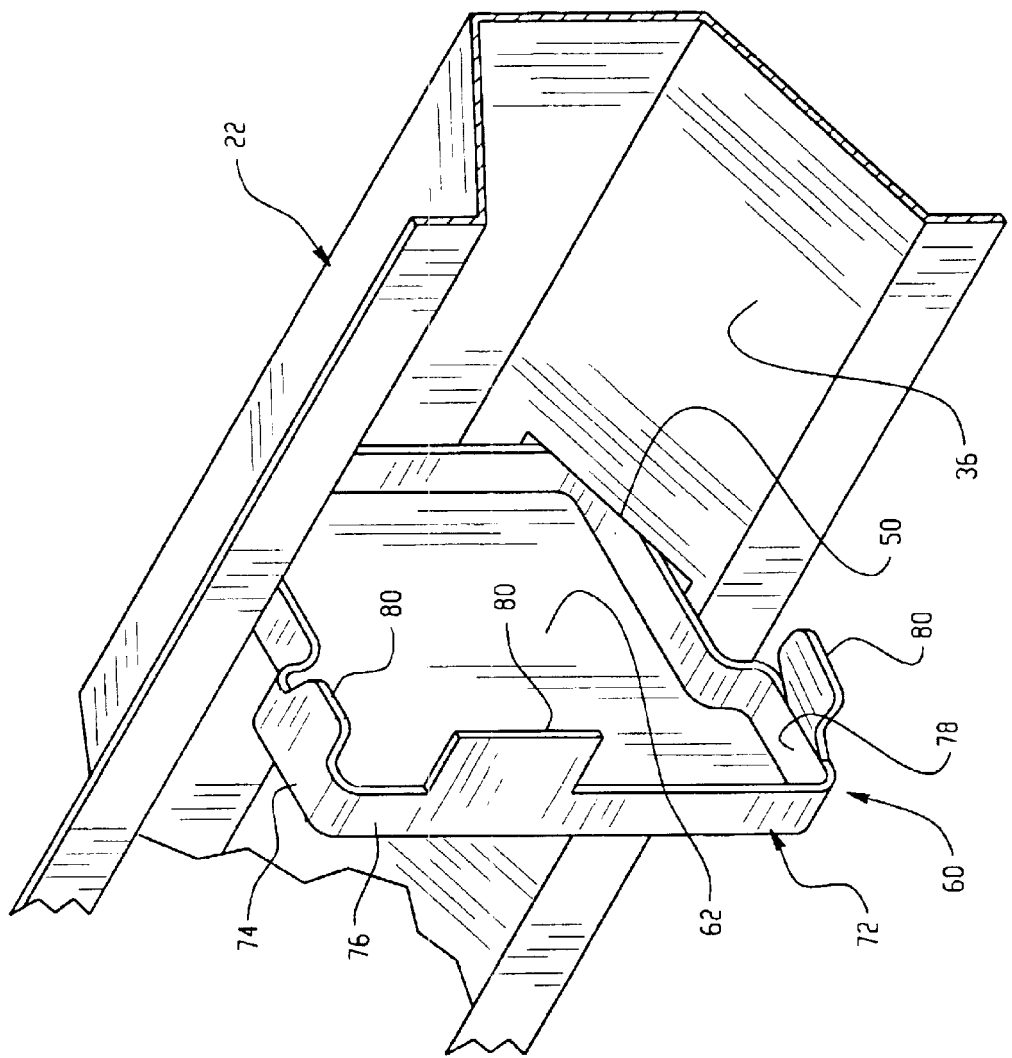
FIG. 3 is a perspective view of the reinforcing member and one half of the hollow sill beam of FIG. 1 showing the receipt of the reinforcing member within a slot of the hollow sill beam.

With additional reference to FIG. 3, the reinforcement member 22 includes a recess or opening 50. In the first preferred embodiment, the opening 50 has a length greater than a width to form a slot-like configuration that is oriented in a transverse direction relative to the longitudinal axis of the beam assembly 10. The opening 50 is defined in the lower wall 36 of the reinforcement member 22.

With reference to FIG. 2, the sill beam assembly 10 includes a reinforcing member 60, also referred to herein as a bulkhead or a stiffening device, transversely received within the hollow area. The reinforcing member 60 has a generally planar body portion 62 that is larger in size than the cross-section of the interior cavity and appropriately shaped to substantially fill the cross-section of the hollow area. More specifically, the perimeter of the planar body portion is generally complementary to the channels 30,42 of the inner and reinforcement members 20,22 except for a portion of the reinforcing member 60 that is received through the opening 50 as will be described in more detail below.

Figure 4:
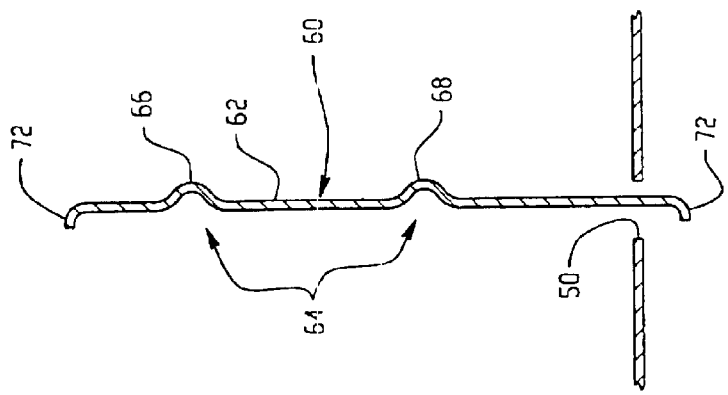
FIG. 4 is a partial cross-section view of the hollow sill beam and the reinforcing member taken along the line 4—4 of FIG. 2.

With reference to FIGS. 2 and 4, the reinforcing member 60 includes an embossed area generally designated by reference numeral 64. In the embodiment illustrated, the embossed area 64 includes a pair of horizontal embossments or ribs 66,68 that are oriented at an angle approximately normal to the longitudinal axis of the sill beam assembly 10. Each of the ribs 66,68 extends across a portion of the body portion 62 from a position on the planar body portion 62 adjacent the base wall 28 to another position on the planar body portion 62 adjacent the base wall 40. The ribs 66,68 serve to rigidify the planar body portion 62 of the reinforcing member 60 to resist deflection and bending. In the first preferred embodiment, the ribs 66,68 are shown as projecting from the planar body portion 62 in the direction of the front of the vehicle. However, it is to be appreciated that the ribs 66,68 could be oriented to project toward the rear of the vehicle. Further, it should be appreciated that other embossments are contemplated, such as cross-patterns, a single rib or three or more ribs, etc., and should be considered within the scope of the present invention.

With additional reference to FIG. 3, about the periphery of the body portion 62, an upturned edge or flange 72 extends from the body portion 62 in a direction approximately parallel to the longitudinal axis of the sill beam assembly 10. The periphery flange 72 serves to stiffen the edges of the reinforcing member 60 and to further rigidify the planar body portion 62 to resist deflection and bending. In the first preferred embodiment, the periphery flange is shown as a continuous flange projecting from the planar body 62 about its entire periphery in the direction of the rear of the vehicle. However, it is to be appreciated that the projection direction could be reversed and/or the flange arrangement could be altered such as by having several discontinuous flanges or a flange that does not extend around the entire periphery.

At select locations around the perimeter of the reinforcing member, the shape of the planar body portion 62 allows the periphery flange 72 to not only substantially fill or complement the cross-section of the hollow area but to abut the walls of the hollow sill beam assembly 10. More particularly, an upper periphery flange portion 74 abuts the upper wall 26 of the inner sill member 20. Likewise, a base periphery flange portion 76 abuts the base wall 28 of the inner member 20 and a lower periphery flange portion 78 abuts the lower wall 24 of the inner member 20.

At each of these select locations, the periphery flange 72 includes an extension flange or tab 80 extending in the same direction as the periphery flange 72. The tabs 80 are also adapted to abut the respective walls 24,26,28 of the sill inner member 20. In this configuration, the tabs 80 overlie the inner member 20 and are capable of being suitably attached or mounted to the inner member 20 such as by welding. Thus, the mounting flanges or tabs 80 permit the reinforcing member 60 to be secured to the inner member 20 along all three walls 24,26,28 of the inner member 20.

With specific reference to FIG. 4, the reinforcing member 60 is received in the slot or opening 50. More particularly, with additional reference to FIG. 2, the body portion 62 of the reinforcing member 60 includes a tab or tongue 82 that is received in the opening 50. The tongue 82 extends beyond or passes through the lower wall 36 of the reinforcement member 22 as shown in FIG. 2 thereby longitudinally locking the reinforcing member 60 to the reinforcement member 22.

Thus, in the assembled construction, the side sill beam assembly 10 includes a bulkhead 60 securely attached to the sill inner member 20 by welding and locked to the sill reinforcement member 22 by receipt of the tongue 82 in the opening 50. This construction eliminates or reduces the need for two bulkheads within a sill beam assembly. The single bulkhead 60 is securely attached to all three sides 24,26,28 of the inner member 20 which increases vehicle body stiffness thereby preventing the inner member 20 from opening during bending of the vehicle body. Further, the single bulkhead 60 is longitudinally locked to the reinforcement member 22, i.e., prevented from moving along the longitudinal axis of the sill beam assembly 10 relative to the reinforcement member 22. The locking connection between the bulkhead 60 and the reinforcement member 22 prevents the bulkhead 60 from folding, or at least reduces the likelihood of the bulkhead 60 folding, during a side impact collision thereby preventing the side sill reinforcement member 22 from collapsing or at least lessening the chances of the side sill outer member collapsing.

To assemble the side sill beam assembly 10, the reinforcing member 60 is attached to the inner member 20. More specifically, one of the tabs 80 of the reinforcing member 60 is welded to each of the walls 24,26,28 of the inner member 20. Next, the reinforcement member 22 is brought into engagement with the inner member 20. That is, the reinforcement member flanges 44,46 are brought into contact with the inner member flanges 32,34. As the reinforcement member 22 is mated or brought into contact with the inner member 20, the reinforcing member 60 is aligned with and received within the opening 50. Lastly, the inner and reinforcement members 20,22 are secured to one another by a suitable means such as welding.

Figure 5:
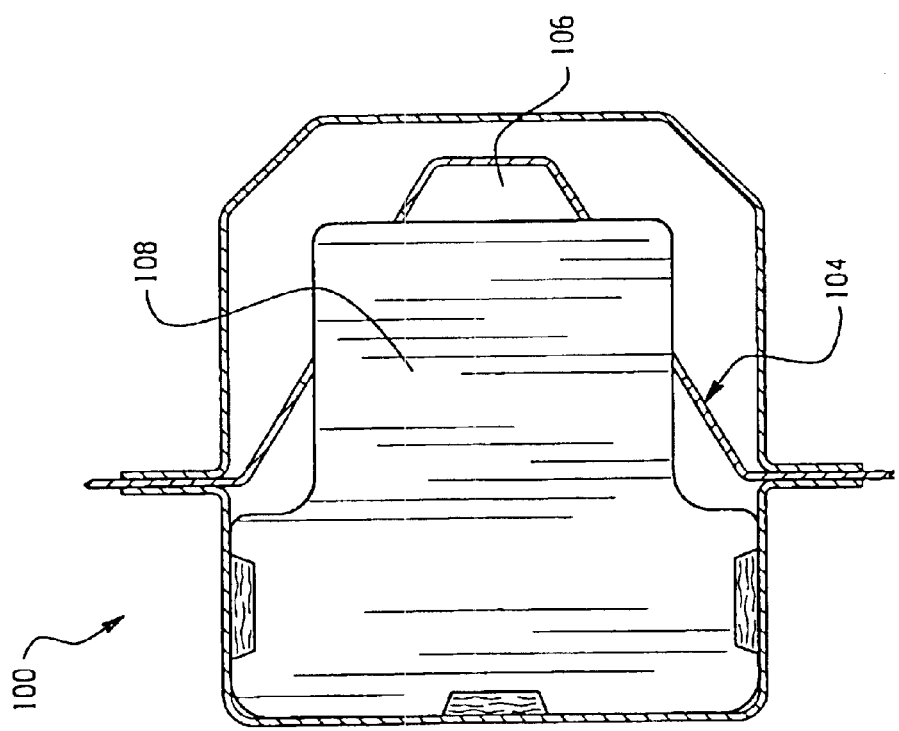
FIG. 5 is a cross-section view of an elongated hollow sill beam and a reinforcing member according to a second preferred embodiment of the present invention.

According to a first alternate embodiment, with reference to FIG. 5, a side sill beam assembly 100 is the same as the side sill beam assembly 10 in most respects. However, the side sill beam assembly 100 differs in that it includes a reinforcement member 104 having two receiving openings. More specifically, the reinforcement member 104 defines a triangular-shaped channel 106 having two receiving openings in opposed sides for receiving corners of a generally rectangular-shaped bulkhead 108.

Figure 6:
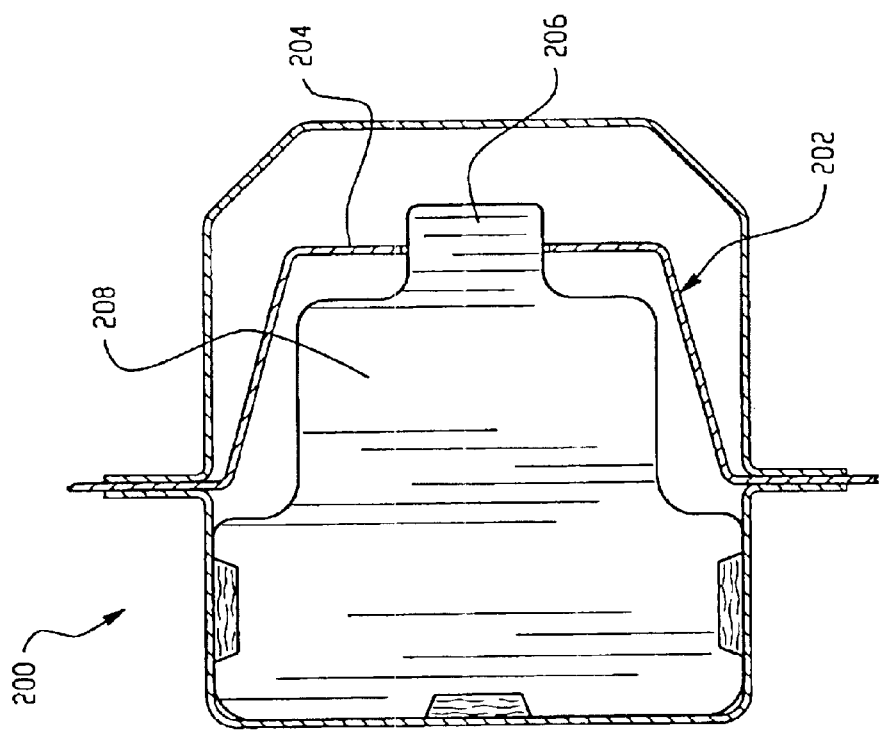
FIG. 6 is a cross-section view of an elongated hollow sill beam and a reinforcing member according to a third preferred embodiment of the present invention.

According to a second alternate embodiment, with reference to FIG. 6, a side sill beam assembly 200 is the same as the side sill beam assembly 10 in most respects. However, the side sill beam assembly 200 differs in that it includes a reinforced member 202 having a single receiving opening in a base wall 204 thereof for receiving a tongue 206 of bulkhead 208.

The invention has been described with reference to the preferred embodiments. Obviously, modification and alterations will occur to others upon reading and understanding the preceding detailed description. It is intended that the invention be construed as including all such modifications and alterations insofar as they are within the scope of the appended claims and equivalence thereof.

Having thus described the preferred embodiments, the invention is now claimed to be:

1. A hollow sill beam assembly for use on a vehicle body construction, the sill beam assembly comprising:
   a first elongated side sill member;
   a second elongated side sill member mated to the first side sill member;

a hollow area defined between the first and second elongated side sill members;

a slot defined in the second side sill member; and a reinforcing member received in the slot locking the reinforcing member from movement along a longitudinal length of the second side sill member and fixedly secured to the first side sill member.

2. The hollow sill beam assembly of claim 1 wherein the reinforcing member is substantially planar and has a perimeter shape that substantially fills a cross-section of the hollow area.

3. The hollow sill beam assembly of claim 1 wherein the reinforcing member includes an embossed area on a substantially planar portion of the reinforcing member to resist bending of the reinforcing member.

4. The hollow sill beam assembly of claim 1 wherein the reinforcing member includes a plurality of upturned edges to resist bending of the reinforcing member.

5. The hollow sill beam assembly of claim 1 wherein the reinforcing member includes at least one flange adjacent the second sill side member for being fixedly secured thereto.

6. The hollow sill beam assembly of claim 5 wherein the at least one flange is welded to the second sill side member.

7. A hollow sill beam assembly located longitudinally along the exterior of a vehicle body, the sill beam assembly comprising:

a side sill inner panel;

a side sill reinforcement panel connected to the side sill inner panel;

a slot defined in the side sill reinforcement panel;

a bulkhead extending between the side sill inner panel and the side sill reinforcement panel in a generally transverse direction relative to the longitudinal orientation of the sill beam assembly, the bulkhead received in the slot and longitudinally locking one edge of the bulkhead to a position on the side sill reinforcement panel; and another edge of the bulkhead fixedly secured to the side sill inner panel.

8. The hollow sill beam assembly of claim 7 wherein the edge of the bulkhead fixedly secured to the side sill inner panel includes a flange for overlying on the side sill inner panel to permit the edge to be fixedly secured to the side sill inner panel.

9. The hollow sill beam assembly of claim 7 wherein the side sill inner panel is generally U-shaped having three sides adjacent three sides of the bulkhead, each of the three bulkhead sides includes a mounting flange for connecting the bulkhead to each of the three sides of the U-shaped side sill inner panel.

* * * * *